Patented Oct. 1, 1929

1,729,709

UNITED STATES PATENT OFFICE

CHARLES H. CAMPBELL, OF PITTSBURGH, PENNSYLVANIA, ASSIGNOR TO AMERICAN GLUE COMPANY, OF BOSTON, MASSACHUSETTS, A CORPORATION OF MASSACHUSETTS

RUBBER COMPOSITION

No Drawing.    Application filed October 22, 1926.    Serial No. 143,522.

The invention relates to an improvement in rubber compositions.

The object of the invention is to combine with rubber, (either natural or reclaimed) a material that will better function as a plasticizing agent preliminary to vulcanization than agents heretofore employed, making the rubber soft and stretchy and still capable of being worked on a warm mill, and after vulcanization will impart to the rubber firmness without hardness or harshness, with high resistance to wear and abrasion and without impairment of elasticity, and a material also possessing the further property of a filler for the rubber when used in relatively large quantities.

The difficulty with the well known plasticizing agents when added to rubber mixes is that they render the rubber extremely tacky and hard to handle except on a cold mill, have little value in imparting stretch to the rubber, and impair the wear-resisting quality of the finished product after vulcanization.

I have found that the objects of my invention are attained if the rubber before vulcanization has mixed or compounded with it one or more albuminates of the metals including such as albuminate of iron, albuminate of zinc, or equivalent albuminate of a metal. In this connection there is preferably employed an albuminate of a metal which comprises some non-hydroscopic metal or inorganic base combined with some of the simple proteids of the albuminoid group and especially an albuminate of iron in which the combination in forming the albuminate is with a proteid like keratin or collagen. The albuminate used, as for example albuminate of iron, is mixed or compounded as a simple mix with the rubber before vulcanizing in the ordinary manner that plasticizing agents or fillers are mixed or compounded with rubber. When used strictly as a plasticizing agent I prefer to use from two to six per cent of the albuminate to the theoretical weight of the rubber in the mass to be treated. The albuminate may, however, be used in a much larger relative quantity and even in an amount where it will function essentially as a filler for the rubber. The albuminate thus added renders the mass soft and stretchy before vulcanizing but not tacky, which is especially desirable under certain conditions of use, and after vulcanization functions in an entirely different manner from a softener or ordinary plasticizing agent as it operates after vulcanization to make the rubber firm, without being hard or harsh; making it also highly resistant to wear and abrasion without impairment of its elastic properties.

The albuminate can best be worked into the rubber in the presence of moisture. For doing this the process described in U. S. Patent No. 1,640,818 of August 30, 1927 can be employed to advantage.

Having thus fully described my invention, I claim and desire to secure by Letters Patent of the United States:—

1. Rubber having albuminate of a metal compounded with it as a simple mix before vulcanizing.

2. Rubber having albuminate of iron compounded with it as a simple mix before vulcanizing.

CHARLES H. CAMPBELL.